United States Patent [19]

Schneider

[11] 4,067,179
[45] Jan. 10, 1978

[54] DRIVING ARRANGEMENT FOR A HARVESTER

[75] Inventor: Rudolf Schneider, Remscheid, Germany

[73] Assignee: Busatis-Werke KG, Remscheid, Germany

[21] Appl. No.: 692,541

[22] Filed: June 3, 1976

[30] Foreign Application Priority Data

June 3, 1975 Germany .............................. 2524464

[51] Int. Cl.² .......................................... A01D 55/02
[52] U.S. Cl. .................................................... 56/297
[58] Field of Search ................ 56/297, 260, 275, 16.2

[56] References Cited

U.S. PATENT DOCUMENTS

| 2,664,690 | 1/1954 | Huddle et al. | 56/297 |
| 2,787,111 | 4/1957 | Templeton | 56/297 |
| 2,823,506 | 2/1958 | Irving | 56/16.2 |
| 3,058,288 | 10/1962 | Karg | 56/297 |
| 3,246,461 | 4/1966 | Wood | 56/297 |

FOREIGN PATENT DOCUMENTS

| 244,168 | 4/1963 | Australia | 56/297 |
| 771,868 | 3/1959 | Canada | 56/297 |
| 1,290,757 | 3/1969 | Germany | 56/297 |
| 1,582,418 | 6/1970 | Germany | 56/297 |

Primary Examiner—Russell R. Kinsey
Attorney, Agent, or Firm—Michael J. Striker

[57] ABSTRACT

A pair of cooperating elongated cutting members is mounted on the frame of a harvester for reciprocation along a common plane located intermediate the cutting members by means of arms pivotally connected to the frame and to the cutting members. A lever is pivoted to each of the cutting members and to the frame and has the same effective length as the associated arm, the pivot points of the associated arm and lever being located in the corners of an imaginary parallelogram. A crank drive moves a pair of connecting rods which are articulated to the respective levers intermediate the pivot points thereof. The cutting members have a plurality of recesses which are laterally bounded by cutting edges extending transversely of the elongation of the respective cutting members so that the objects which enter into the recesses are cut by the cutting edges in the common plane. The axis of rotation of the crank may be vertical, while the levers and arms may reciprocate in parallel horizontal planes. A hydraulic motor for driving the crank may be located directly above the crank, and the crank may be mounted on the output shaft of the motor for shared rotation therewith.

15 Claims, 5 Drawing Figures

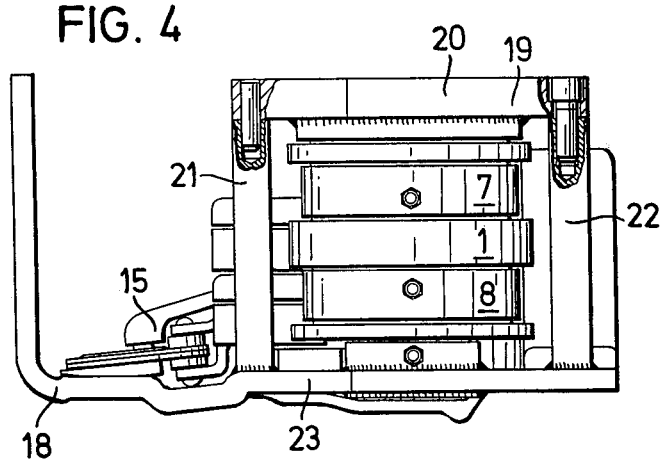
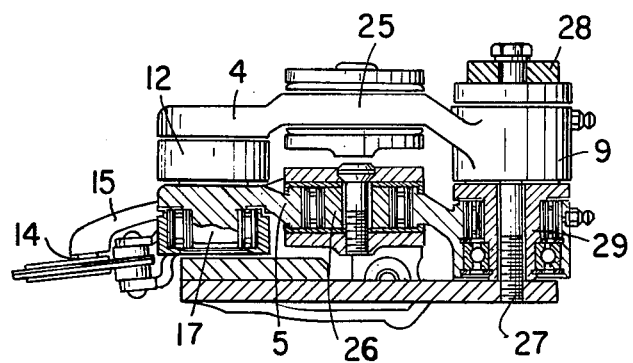

DRIVING ARRANGEMENT FOR A HARVESTER

BACKGROUND OF THE INVENTION

The present invention relates to a harvester in general, and more particularly to a drive arrangement for driving the cutting members of the harvester.

There are already known various types of cutting arrangements of the type here under consideration. The present invention will concentrate on a cutting arrangement for use in a harvester, but it will be appreciated that the concepts of the present invention can also be used to advantage in different types of cutting arrangements. When speaking of a harvester in the context of the present invention, it is to be understood that it includes, but it is not limited to, a mower, a hay harvester, a combined harvester-thresher and other devices for severing crops or plants from the stratum in which they grow.

Usually, the harvesters of this type include cutting elements at least one of which is movable relative to the other so that the stems or stalks of the plants which are to be severed which enter between the cutting edges of the cutting elements during the advancement of the harvester are severed by the combined action of the cutting edges of the cutting members. There are also already known such cutting arrangements in which both cutting members are driven into displacement relative to the frame of the harvester, which improves the cutting efficiency of the cutting arrangement. Usually, such cutting arrangements are driven into displacement by means of a motor, which may be the same as that advancing the harvester, or a separate motor, such as a hydraulic motor. The motor may drive a crank and the crank, in turn, may angularly displace levers which are pivoted to the frame and to the cutting members, via connecting rods. The present invention will be discussed as being embodied in a cutting arrangement in which both of the cutting members reciprocate along a common plane, and some of the conventional cutting arrangements of this type will now be discussed, together with their disadvantages.

In one cutting arrangement of this type, a hydraulic motor is supported on an inwardly located bracket, and an angularly displaceable link is interposed between the motor and a respective one of the cutting elements, which link has connecting portions spaced various distances from the axis of angular displacement of the link for connecting a respective connecting rod moved by the motor and the cutting element thereto. In this conventional arrangement, the hydraulic motor drives a doubly eccentric crank which is connected to the respective links which are mounted on the frame of the harvester for movement about a shared axis, via the connecting rods. In this arrangement, the connecting portions of the links are located at the elevation of the axis of rotation of the crank, and the above-mentioned axis is supported on additional brackets which are connected to the first-mentioned bracket.

This cutting arrangement is disadvantageous in that the links are mounted for angular displacement in vertical planes and conduct part-circular movements in the vertical planes as a result of the above-mentioned particular configuration of the drive arrangement. These vertical movements are transmitted to the rear parts of the cutting elements which, in turn, conduct part-circular movements in parallel horizontal planes due to the support of the cutting members on the frame of the harvester by means of horizontally angularly displaceable support arms. This combination of vertical and horizontal movements of various components of the cutting arrangement results in a situation where the rear portions of the cutting members are subjected to excessive and superfluous stresses which, in turn, may result in a rather rapid fatigue deterioration of the material of the cutting members and the disintegration of the latter. A further disadvantage of this conventional arrangement is to be seen in the fact that the cutting members will spread apart from one another when the cutting arrangement is operated at high speeds, in the vertical direction. When this happens, at least one of the cutting members will be spaced from the common plane at which the plants are to be severed, which will considerably impair the cutting efficiency of the cutting arrangement and, under some circumstances, it may result in clogging or jamming of the cutting arrangement. A still another drawback of this conventional arrangement is that the driving arrangement can only be located at one of the longitudinal ends of the cutting arrangement, inasmuch as at least one bracket is needed for the support of the links, which must be located frontwardly of the cutting members when considered in the direction of advancement of the harvester, and this bracket forms an obstruction in the way of faultless introduction of the stems of the plants toward and into the cutting arrangement. This latter drawback is particularly pronounced, and generates the most problems, when the cutting arrangement is to be located frontwardly of the harvester. More particularly, under such circumstances, it is necessary for proper weight distribution and suppression of oscillations to arrange the driving arrangement approximately in the middle of the harvester. Thus, this particular arrangement cannot be used in connection with a cutting arrangement which is to be located frontwardly of the harvester.

There is further known a driving arrangement for a laterally driven cutting arrangement with a pair of oppositely reciprocating cutting members, in which the upper and the lower driving links have different effective lengths. When speaking of an effective length throughout the specification, it is meant to designate the distance between the pivot points at the frame of the harvester and at the cutting members, respectively. In this particular arrangement, the lines of application of the driving forces which commence at the pivot points of the driving links are so selected that they pass through the centers of gravity of the cutting members, in order to reduce the bending stress of the particular cutting member. Such an arrangement is rather complex and expensive, and it must be adapted to each particular length of the cutting member.

SUMMARY OF THE INVENTION

Accordingly, it is a general object of the present invention to avoid the disadvantages of the prior-art arrangements. More particularly, it is an object of the present invention to provide a driving arrangement for driving cutting members of a harvester, which is simple in construction and reliable in operation.

It is a further object of the present invention to provide a drive arrangement which is so constructed as not to apply any other than the driving forces to the cutting members. A concomitant object of the present invention is to provide a driving arrangement of the type here under consideration which can be located at an arbitrarily selected location adjacent to the cutting arrangement. Still another object of the present invention is to provide a driving arrangement which is compact and occupies only a minimum amount of space next to the cutting arrangement.

In pursuance of these objects and others which will become apparent hereafter, one feature of the present invention resides, briefly stated, in a cutting machine, particularly in a harvester, in a combination which comprises support means; cutting means including a first and a second cutting member having respective cutting edges; means for mounting the cutting means on the support means for individual displacement along a common plane located intermediate the cutting members, the mounting means including at least one first and one second arm, a first and a second journal mounting the first and second arms, respectively, on the support means for movement in parallel planes, and a first and a second pivot articulating the first and second arms, respectively, to the first and second cutting members, the first pivot being spaced a first distance from the first journal, and the second pivot being spaced a second distance from the second journal. The combination of the present invention further includes means for displacing the cutting means, which includes driving means, a crank means driven by the driving means into rotation about an axis normal to the parallel planes and including a first and a second crank portion offset from the axis, and transmission means including a first and a second lever, a first and a second additional journal mounting the first and second levers, respectively, on the support means for movement in parallel planes, a first and a second additional pivot articulating the first and second levers, respectively, to the first and second cutting members, the first additional pivot being spaced the first distance from the first additional journal and the second additional pivot being spaced the second distance from the second additional journal, and a first and a second connecting rod mounted on the first and second crank portion, respectively, and pivoted to the first and second levers, respectively.

In a currently preferred embodiment of the present invention, the first journal and pivot and the first additional journal and additional pivot are arranged in corners of an imaginary parallelogram, and the second journal and pivot and the second additional journal and additional pivot are arranged in corners of a different imaginary parallelogram. It is also currently preferred that the first and second distances be the same.

This arrangement is particularly advantageous in that the cutting members conduct the same part-circular movements as the additional pivots which connect the levers to the cutting members. Thus, the levers will transmit to the cutting members only such forces which are directed tangentially to the path of movement of the respective cutting member.

According to further advantageous features of the present invention, the above-mentioned parallel planes are substantially horizontal and the above-mentioned axis of the crank means is substantially vertical. Furthermore, it is advantageous if the first and second additional journals are axially aligned with one another in direction normal to the parallel planes. According to a further aspect of the present invention, the crank means includes a crank member, and the crank portions are integral eccentric portions of the crank member. The transmission means may include a first and a second connecting pivot arranged intermediate the first additional journal and the first additional pivot, and intermediate the second additional journal and the second additional pivot, respectively, and articulating the first and second connecting rods, respectively, to said first and second levers, respectively. The first connecting pivot may be spaced substantially one-half of the above-mentioned first distance from the first additional pivot, and the second connecting pivot may be spaced substantially one-half of the above-mentioned second distance from the second additional pivot.

The driving means of the present invention may include a motor which has an output shaft, and the crank means may be mounted on the output shaft for shared rotation therewith about the axis, the motor being axially spaced from the parallel planes. Preferably, the motor is a hydraulic motor. On the other hand, it is also possible to situate the motor at a distance from the crank means, and to interpose motion-transmitting means between the output shaft of the motor and the crank means, which motion-transmitting means is operative for rotating the crank means in dependence on the rotation of the output shaft. The motion-transmitting means may include a V-belt drive.

The cutting means may include respective first and second head pieces for mounting the first and second cutting elements, and the first and second additional pivots may be articulated to the first and second head pieces, respectively. The first and second cutting members may be elongated along the above-specified common plane, and the cutting edges of the cutting members may be inclined relative to the elongation of each respective cutting member so that the respective cutting edge of one of the cutting members may cooperate with an associated cutting edge of the other cutting member to cut an object located intermediate the cutting edges in the common plane. Advantageously, the cutting edges define a plurality of recesses in each of the cutting members into which the objects to be cut penetrate during the operation of the cutting machine to be cut by the cutting edges of the cutting members during the displacement thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 3 is a side elevational view of the arrangement of FIG. 1 partially sectioned on line III—III of FIG. 1;

FIG. 4 is a side-elevational view taken in the direction of the arrow IV of FIG. 1.

DETAILED DISCUSSION OF THE PREFERRED EMBODIMENTS

Figure 2:
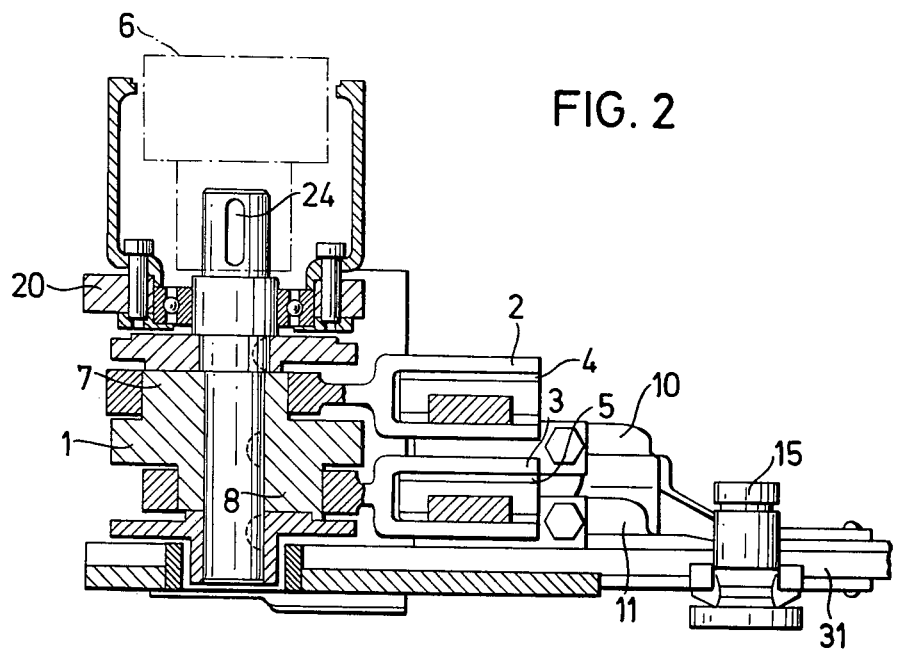
FIG. 2 is a partially sectioned rear elevational view of FIG. 1 taken on line II—II of FIG. 1.
Figure 1:
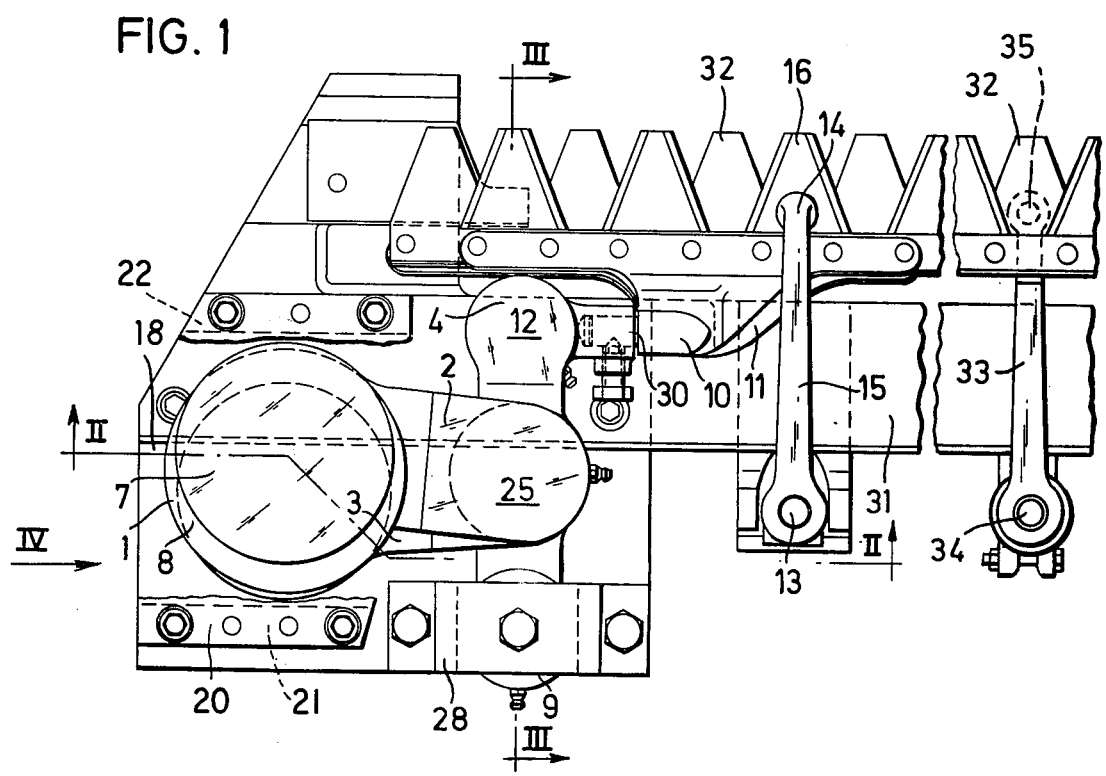
FIG. 1 is a top plan view of a segment of the cutting arrangement and of the drive arrangement therefor.

Referring now to the various Figures of the drawing in which the same reference numerals designate corresponding parts, it may be seen that only such parts of the body of the harvester which are necessary for understanding the present invention have been illustrated.

Figure 5:
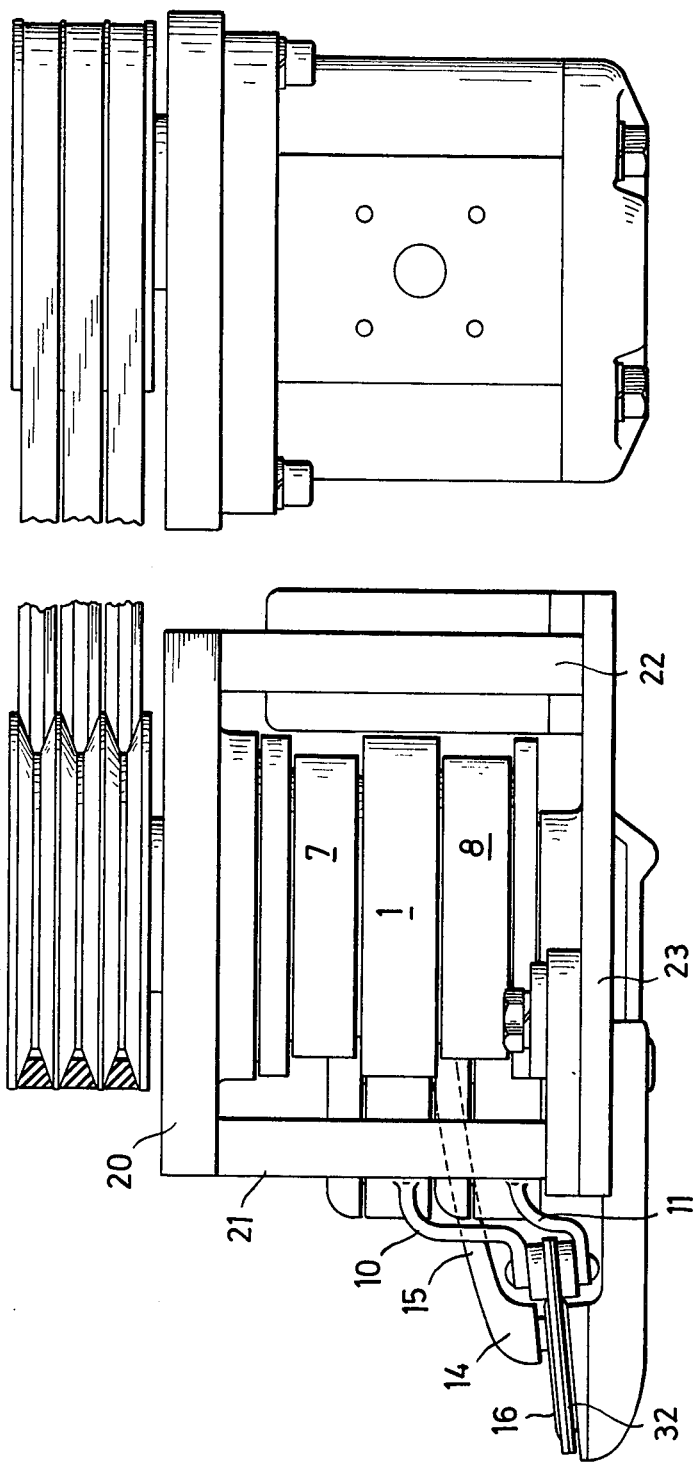
FIG. 5 is a view similar to FIG. 4 but illustrating a modified drive arrangement.

These parts include a bracket 18 having a portion 23 on which the cutting arrangement of the present invention is supported. A frame 19 having a cover 20, a front wall 21, and a rear wall 22, is connected to the bracket 18. The frame 19 partially protects the driving arrangement of the present invention from being soiled or otherwise detrimentally influenced by contaminants. The frame 19 further serves the purpose of supporting a crank 1, which is of a substantially disc-shaped configuration and which is supported for rotation in the portion 23 of the bracket 18 at its lower end, and in the cover plate 20 at its upper end. A motor 6 is mounted on the cover plate 20 and has an output shaft 24 which is connected to the crank member 1 for shared rotation. The motor 6 is preferably mounted on the cover plate 20 in a vertical position, being located upwardly of the cover plate 20, and the axis of rotation of the output shaft 24 extends in the vertical direction. However, it is also conceivable and contemplated by the present invention that the motor 6 could be mounted on the cover plate 20 with its axis extending horizontally, in which event bevel gears could be interposed between the output shaft 24 and the crank member 1 for converting the rotation of the former about a horizontal axis into the rotation of the latter about a vertical axis. It is also possible to locate the motor 6 at a distance from the crank member 1, and a motion-transmitting arrangement, such as a V-belt transmission, can be used for transmitting the rotary motion of the output shaft 24 to the crank member 1. This latter possibility is illustrated in FIG. 5.

The crank 1 has an upper eccentric portion 7 and a lower eccentric portion 8 which rotate in horizontal planes. An upper connecting rod 2 is mounted on the upper eccentric portion 7, and a lower connecting rod 3 is mounted on the lower eccentric portion 8 for pivoting movement in a respective horizontally extending plane. The connecting rods 2 and 3 preferably have bifurcated end portions which straddle pivoting portions 25 and 26 of levers 4 and 5. The levers 4 and 5 are elongated, and the pivoting portions 25 and 26 are situated between the longitudinally spaced end portions of the levers 4 and 5, preferably in the middle regions thereof. The connecting rods 2 and 3 thus convert the eccentric movements of the eccentric portions 7 and 8 into corresponding movements of the levers 4 and 5. The levers 4 and 5 are mounted, preferably on a common journal 27, for pivoting in a horizontal plane relative to the frame of the harvester, being supported at its lower end in the portion 23 of the bracket 18, and at the upper end in a support element 28. Bearings 9 and 29 of the levers 4 and 5 are mounted on the journal 27. Pivots 12 and 17 are mounted at the ends of the levers 4 and 5 which are longitudinally spaced from the journal 27, the pivots 12 and 17 articulating the levers 4 and 5 to respective head pieces 10 and 11 of the cutting arrangement. The connection is accomplished in the illustrated embodiment by a clamping screw connection 30.

The cutting arrangement proper includes a plurality of upper cutting blades 16 connected with one another in a conventional manner, and a plurality of lower cutting blades 32 similarly interconnected. The upper cutting blades 16 are supported in a pivotable manner on angularly displaceable arms 15, while the lower cutting blades 32 are also pivotably supported on angularly displaceable lower arms 33. The arms 15 and 33 are supported on a beam 31 for pivoting relative thereto. The upper arm 15 is supported on a journal 13, and connected to the upper cutting member or a cutting blade 16 thereof for relative pivoting about a pivot 14. The distance of the pivot 14 from the journal 13 of each arm 15, of which there can be more than the one illustrated, corresponds to the distance of the pivot 12 of the lever 4 from the bearing 9, so that the axes of these pivots and journals are spatially distributed in the corners of an imaginary parallelogram. The same is true about the spatial distribution and arrangement of the lower lever 5 relative to each of the support arms 33, of which again there can be more than one. Each arm 33 is pivoted to the beam 31 by means of a journal 34, and to the respective cutting blade 32 of the lower cutting member by a pivot 35. Here again, the distance of the pivot 35 from the journal 34, i.e. the effective length of the arm 33, equals the effective length of the lever 5 measured between the pivot 17 and the bearing 29. Preferably, the effective length of the levers 4 and 5 and of the arms 15 and 33 are all the same. As a result of this arrangement, the pivots 12 and 14, or 17 and 35, move in compatible part-circular paths so that the various components of the cutting arrangement cannot act on one another with forces which would result in stressing of the cutting members of the arrangement.

Inasmuch as the entire driving arrangement is or can be located rearwardly of the cutting arrangement, the cutting arrangement of the present invention can be mounted frontwardly of the harvester in which the cutting arrangement is to be used, and the driving arrangement can be located at any point rearwardly of the cutting arrangement when considered in the direction of advancement of the harvester. In addition thereto, all of the components of the driving arrangement are very compact and are arranged in a space-saving manner, which adds to the versatility of application of the combination of the cutting arrangement and of the driving arrangement of the present invention.

It will be understood that each of the elements described above, or two or more together, may also find a useful application in other types of constructions differing from the types described above.

While the invention has been illustrated and described as embodied in a harvester, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a cutting machine, particularly in a harvester, a combination comprising support means; cutting means including a first and a second cutting member having respective cutting edges; means for mounting said cutting means on said support means for individual displacement along a common plane located intermediate said cutting members, including at least one first and one second arm, a first and a second journal mounting said first and second arms, respectively, on said support means for movement in parallel planes, and a first and a second pivot articulating said first and second arms, respectively, to said first and second cutting members, said first pivot being spaced a first distance from said first journal, and said second pivot being spaced a second distance from said second journal; and means for displacing said cutting means, including driving means, crank means driven by said driving means into rotation about an axis normal to said parallel planes and including a first and a second crank portion offset from said axis, and transmission means including a first and a second lever, a first and a second additional journal mounting said first and second levers, respectively, on said support means for movement in parallel planes, a first and a second additional pivot articulating said first and second levers, respectively, to said first and second cutting members, said first additional pivot being spaced said first distance from said first additional journal and said second additional pivot being spaced said second distance from said second additional journal, and a first and a second connecting rod mounted on said first and second crank portions, respectively, and pivoted to said first and second levers, respectively.

2. A combination as defined in claim 1, wherein said first journal and pivot and said first additional journal and additional pivot are arranged in corners of an imaginary parallelogram; and wherein said second journal and pivot and said second additional journal and additional pivot are arranged in corners of a different imaginary parallelogram.

3. A combination as defined in claim 1, wherein said first distance is equal to said second distance.

4. A combination as defined in claim 1, wherein said parallel planes are substantially horizontal and wherein said axis is substantially vertical.

5. A combination as defined in claim 1, wherein said first and second additional journals are axially aligned with one another in direction normal to said parallel planes.

6. A combination as defined in claim 1, wherein said crank means includes a crank member; and wherein said crank portions are integral eccentric portions of said crank member.

7. A combination as defined in claim 1, wherein said transmission means includes a first and a second connecting pivot arranged intermediate said first additional journal and said first additional pivot, and intermediate said second additional journal and said second additional pivot, respectively, and articulating said first and second connecting rods, respectively, to said first and second levers, respectively.

8. A combination as defined in claim 7, wherein said first connecting pivot is spaced substantially one-half of said first distance from said first additional pivot, and said second connecting pivot is spaced substantially one-half of said second distance from said second additional pivot.

9. A combination as defined in claim 1, wherein said driving means includes a motor which has an output shaft; wherein said crank means is mounted on said output shaft for shared rotation therewith about said axis; and wherein said motor is axially spaced from said parallel planes.

10. A combination as defined in claim 9, wherein said motor is a hydraulic motor.

11. A combination as defined in claim 1, wherein said driving means includes a motor situated at a distance from said crank means and having an output shaft, and motion-transmitting means interposed between said output shaft and said crank means and operative for rotating the latter in dependence on the rotation of said output shaft.

12. A combination as defined in claim 11, wherein said motion-transmitting means includes a V-belt drive.

13. A combination as defined in claim 1, wherein said cutting means includes respective first and second head pieces for mounting said first and second cutting elements; and wherein said first and second additional pivots are articulated to said first and second head pieces, respectively.

14. A combination as defined in claim 1, wherein said first and second cutting members are elongated along said common plane; and wherein said cutting edges of said cutting members are inclined relative to the elongation of each respective cutting member, the respective cutting edge of one of said cutting members cooperating with an associated cutting edge of the other cutting member to cut an object located intermediate the same in said common plane.

15. A combination as defined in claim 14, wherein said cutting edges define a plurality of recesses in each of said cutting members into which the objects to be cut penetrate during the operation of the cutting machine to be cut by said cutting edges of said cutting members during the displacement thereof.

* * * * *